Patented Aug. 31, 1937

2,091,571

UNITED STATES PATENT OFFICE 2,091,571

COMPLEX COMPOUNDS OF PHENYL CINCHONINIC ACID AND METHOD OF MAKING THE SAME

Frederick C. Schubart, Pittsburgh, Pa.

No Drawing. Application October 26, 1935,
Serial No. 46,960

4 Claims. (Cl. 260—30)

This invention relates to the production of new compounds of alkylated amino phenyl pyrazolones, and piperazine or guanidine salts of phenyl quinoline carboxylic acids.

It has been found that new compounds having novel and valuable physical and therapeutical properties may be produced by reacting together under suitable conditions an alkylated aminopyrazolone, such as 1-phenyl-2.3-dimethyl-4-dimethylamino-5-pyrazolone with a piperazine or guanidine salt of 2-phenyl-quinoline-4-carboxylic acid or the components of such salts.

The new compounds are more soluble and more stable in solution than the phenyl-quinoline carboxylic acid. They may be produced by melting a mixture of alkylated aminopyrazolone, and a salt of phenyl-quinoline carboxylic acid with piperazine or guanidine in substantially molecular or polymolecular proportions and heating preferably at a temperature of above 100° C. until a clear melt is obtained; or by heating together a mixture of alkylated amino-pyrazolone, phenyl-quinoline carboxylic acid, and piperazine or guanidine; or by heating a mixture of alkylated amino-pyrazolone and phenyl-quinoline carboxylic acid in the desired molecular proportions until a clear melt is obtained, dissolving the product in a suitable solvent, such as alcohol, in the presence of piperazine or guanidine, and evaporating the solvent from the resulting compound; or by dissolving the alkylated amino pyrazolone, phenyl-quinoline carboxylic acid, and piperazine or guanidine in a suitable solvent, such as alcohol, and evaporating the solvent from the resulting compound.

In general the compounds of the invention comprise one or more molecules of alkylated aminopyrazolone to each molecule of piperazine or guanidine salt of phenyl-quinoline carboxylic acid.

In place of piperazine itself, its alkyl derivatives, such as mono- and di-methyl, ethyl- and butyl-piperazines may be used in the invention, and in place of guanidine itself, its alkyl and acyl derivatives, such as mono- and di-methyl and ethyl-guanidines and methyl-acetyl-guanidine may be used. When using guanidines in the invention either the neutral or the basic salts of phenyl quinoline carboxylic acid, or such proportions of the components as will give the neutral or basic salts, may be used.

The new compounds of the invention are in general yellowish to brownish non-crystalline materials, dissolving readily in water and alcohol, softening above 70° C. and melting at about 90° C. The solutions gradually increase in viscosity as the concentration is increased, and exhibit the properties of colloidal rather than true crystalloidal solutions.

The compounds gradually hydrolyze in the presence of water, more rapidly on heating, breaking down into the alkylated amino-pyrazolone and the corresponding salt of phenyl-quinoline carboxylic acid.

The following are typical examples embodying the principles of the invention:

1. 200 grams of piperazine hydrate (m. p. 45° C.) or 90 grams of anhydrous piperazine (m. p. 104° C.) are melted and heated to about 110° C. 250 grams of 2-phenyl-quinoline-4-carboxylic acid are dissolved in the melt in portions, and 235 grams of 1-phenyl-2,3-dimethyl-4-dimethylamino-5-pyrazolone are added. The temperature of the melt is raised to about 135° C. and held at this temperature, with stirring, until the melt is clear and no more bubbles of steam are given off. The melt is then cooled down slowly and the cooled melt is pulverized.

The cooled melt is a yellowish brown glassy substance and when pulverized forms an amorphous powder, softening at 70° C. and melting at 90° C., and dissolving in water to form stable solutions which can be obtained up to about 50% concentration in the cold.

2. 135 grams of guanidine carbonate are dissolved in 500 cubic centimeters of water and heated to boiling. 500 grams of 2-phenyl-quinoline-4-carboxylic acid are added in portions with stirring. Carbon dioxide is evolved and the quinoline carboxylic acid slowly and completely dissolves. The hot solution is filtered and allowed to cool. A guanidine salt of the quinoline carboxylic acid crystallizes in colorless needles as a stable salt without water of crystallization, melting at 243° C. The solubility in water is about 1.7% at 25° C.

3. 235 grams of 1-phenyl-2.3-dimethyl-4-dimethylamino-5-pyrazolone are heated to about 135° C. 320 grams of the guanidine salt of 2-phenyl-quinoline-4-carboxylic acid are added to the pyrazolone and the melt is held at about 135° C. with stirring until the melt is clear and no more steam bubbles escape. The melt is then cooled slowly and the cooled melt is pulverized.

The product is a brownish amorphous material softening at 70° C. and fluid at 90° C. It readily dissolves in water to high concentrations. It hydrolyzes more readily than the corresponding piperazine compound, precipitating the much less soluble guanidine salt of the quinoline carboxylic acid.

The compound is highly soluble in alcohol at ordinary temperatures, forming fluid solutions at low concentrations, viscous syrups at concentrations of about 50% and at higher concentrations (about 70%) forming glassy "solid solutions." The alcoholic solutions are stable and the original compound can be completely recovered on evaporation of the solvent.

I claim:

1. A complex compound resulting from the combination of one molecule of 2-phenyl-quinoline-4-carboxylic acid, at least one molecule of piperazine, and at least one molecule of 1-phenyl-2.3-dimethyl-4-dimethylamino-5-pyrazolone.

2. A complex compound resulting from the interaction of one molecule of a piperazine salt of 2-phenyl-quinoline-4-carboxylic acid and at least one molecule of 1-phenyl-2.3-dimethyl-4-dimethylamino-5-pyrazolone.

3. A method of producing new complex compounds which comprises heating together 2-phenyl-quinoline-4-carboxylic acid, piperazine, and 1-phenyl-2.3-dimethyl-4-dimethylamino-5-pyrazolone.

4. A method of producing new complex compounds which comprises heating together a piperazine salt of 2-phenyl-quinoline-4-carboxylic acid and 1-phenyl-2.3-dimethyl-4-dimethylamino-5-pyrazolone.

FREDERICK C. SCHUBART.